(12) United States Patent
Bangay

(10) Patent No.: US 9,384,399 B2
(45) Date of Patent: Jul. 5, 2016

(54) METHOD AND SYSTEM FOR PROCESSING IMAGE DATA OBTAINED FROM SCANNING A NETWORK INFRASTRUCTURE

(75) Inventor: James Gordon Bangay, Queensland (AU)

(73) Assignee: FUGRO ROAMES PTY LTD., Queensland (AU)

( * ) Notice: Subject to any disclaimer, the term of this patent is extended or adjusted under 35 U.S.C. 154(b) by 269 days.

(21) Appl. No.: 14/117,996

(22) PCT Filed: May 16, 2012

(86) PCT No.: PCT/AU2012/000545
§ 371 (c)(1),
(2), (4) Date: Feb. 11, 2014

(87) PCT Pub. No.: WO2012/155205
PCT Pub. Date: Nov. 22, 2012

(65) Prior Publication Data
US 2014/0177928 A1    Jun. 26, 2014

(30) Foreign Application Priority Data
May 16, 2011    (AU) ................................ 2011901865

(51) Int. Cl.
*G06K 9/00*    (2006.01)
*G06T 7/00*    (2006.01)

(52) U.S. Cl.
CPC .......... *G06K 9/00651* (2013.01); *G06T 7/0057* (2013.01); *G06T 2207/10028* (2013.01); *G06T 2207/20021* (2013.01); *G06T 2207/20061* (2013.01); *G06T 2207/30184* (2013.01)

(58) Field of Classification Search
None
See application file for complete search history.

(56) References Cited

U.S. PATENT DOCUMENTS 3,069,654 A    12/1962    Hough et al.
4,641,960 A *  2/1987    Bozzolato ........................ 356/2
(Continued)

FOREIGN PATENT DOCUMENTS

JP    2006-065452    3/2006
JP    2007-271408    10/2007
(Continued)

OTHER PUBLICATIONS

Dorninger et al., "A Comprehensive Automated 3D Approach for Building Extraction, Reconstruction, and Regularization from Airborne Laser Scanning Point Clouds," Sensors, vol. 8, pp. 7323-7343 (2008).

(Continued)

*Primary Examiner* — Li Liu
(74) *Attorney, Agent, or Firm* — Cozen O'Connor

(57) ABSTRACT

The invention relates to a method and system for processing image data obtained from scanning a network infrastructure for the detection and analysis of specific objects of interest, such as powerlines and other overhead conductors, or similar structures. The image data comprises a plurality of co-ordinate points in three-dimensional space, and in order to identify conductors in the network infrastructure, the method involves analyzing the co-ordinate points to identify sets of co-ordinate points indicative of a set of substantially parallel lines, and analyzing the co⁻ ordinate points on the basis of said identified substantially parallel lines thereby to allow identification and mapping of hanging catenaries representing said conductors.

33 Claims, 9 Drawing Sheets

(56) References Cited

U.S. PATENT DOCUMENTS

| | | | |
|---|---|---|---|
| 5,296,909 A | | 3/1994 | Fazi et al. |
| 6,664,529 B2 | | 12/2003 | Pack et al. |
| 6,747,576 B2 | | 6/2004 | Schaefer |
| 7,046,841 B1 | * | 5/2006 | Dow et al. ............... 382/154 |
| 7,046,851 B2 | | 5/2006 | Keaton et al. |
| 7,098,909 B2 | | 8/2006 | Hayano et al. |
| 7,397,548 B2 | | 7/2008 | Filias et al. |
| 8,244,026 B2 | * | 8/2012 | Nahari et al. ............ 382/154 |
| 8,374,431 B2 | * | 2/2013 | Dow et al. ............... 382/173 |
| 8,527,237 B2 | * | 9/2013 | Pire et al. ............... 702/152 |

FOREIGN PATENT DOCUMENTS

| | | |
|---|---|---|
| JP | 2010-112889 | 5/2010 |
| WO | WO2011/088509 | 7/2011 |

OTHER PUBLICATIONS

Ywa et al., "A Multi-Level Span Analysis for Improving 3D Power-Line Reconstruction Performance Using Airborne Laser Scanning Data," York University, GeoICT Lab, Earth and Space Science and Engineering Department, vol. 38, Part 3A, pp. 97-102 (2010).

Melzer et al., "Extraction and Modeling of Power Lines from ALS Point Clouds," Laboratory for Spatial Data from Laser Scanning and Remote Sensing at Institute of Photogrammetry and Remote Sensing, 8 pages (2004).

PCT/AU2012/000545—International Search Report dated Jul. 30, 2012 (3 pages).

PCT/AU2012/000545—International Preliminary Report on Patentability dated Nov. 28, 2013 and Written Opinion of the International Searching Authority dated Jul. 30, 2012 (6 pages).

Liu et al., "Classification of Airborne LIDAR Intensity Data Using Statistical Analysis and Hough Transform with Application to Power Line Corridors", Digital Image Computing: Techniques and Applications, Dec. 1, 2009, pp. 462-467.

Axelsson, P., "Processing of Laser Scanner Data-Algorithms and Applications", ISPRS Journal of Photogrammetry and Remote Sensing, Jul. 1, 1999, pp. 138-147.

McLaughlin, R.A., "Extracting Transmission Lines From Airborne LIDAR Data", IEEE Geoscience and Remote Sensing Letters, vol. 3, No. 2, Apr. 1, 2006, pp. 222-226.

\* cited by examiner

METHOD AND SYSTEM FOR PROCESSING IMAGE DATA OBTAINED FROM SCANNING A NETWORK INFRASTRUCTURE

CROSS-REFERENCE TO RELATED APPLICATIONS

This application is a U.S. National Phase Application under 35 U.S.C. 371 of International Application No. PCT/AU2012/000545, filed on May 16, 2012, which published as WO 2012/155205 A1 on Nov. 22, 2012, which claims priority from Australian Application No. 2011901865, filed May 16, 2011, all of which are herein incorporated by reference.

FIELD OF THE INVENTION

The invention relates to a method and system for processing image data. More particularly, the invention relates to the processing of such data obtained from scanning a network infrastructure for the detection and analysis of specific objects of interest, such as powerlines and other overhead conductors, and similar structures.

BACKGROUND OF THE INVENTION

Any reference to or discussion of any document, act or item of knowledge in this specification is included solely for the purpose of providing a context for the present invention. It is not suggested or represented that any of these matters or any combination thereof formed at the priority date part of the common general knowledge, or was known to be relevant to an attempt to solve any problem with which this specification is concerned.

Proposals have been made in the past for techniques for machine recognition of selected structures and objects from remote sensing data (eg. by telemetry), such as scanned image data from airborne laser scanning (ALS) or stereo-photogrammetry. From the data it is possible to extract three-dimensional point coordinate data. To avoid the cost and time of manual human interpretation of the image data, it is then necessary to automate the processing of the data in order to associate individual points in space with recognisable objects. To this end a filtering algorithm is required to classify the point data in accordance with particular features of interest. The data defining the resulting objects can then be used in existing computer-based tools for map-making, 3D modeling, land management, asset management, etc.

Examples of previous techniques are described in U.S. Pat. No. 5,296,909, U.S. Pat. No. 7,046,841 and U.S. Pat. No. 7,397,548. However, previous approaches are relatively rudimentary and can suffer from high levels of error (both false positives and false negatives), resulting in data output that is of relatively little value or requires so much post-processing human intervention that the cost and time benefit of automation is partially or completely lost.

Further, prior techniques of identifying powerlines and similar structures have generally focused on transmission line infrastructure, and so are not appropriate for the identification of distribution system powerlines. Transmission powerlines are generally not concealed in any way by vegetation and other impediments to viewing. When applied to distribution powerlines, the existing methods are computationally very slow and require significant human interaction and quality assessment of the results before they can be useful.

Moreover, prior approaches to image data interpretation to identify powerline systems and similar are generally not designed to scale to high volumes of data, such as hundreds or even thousands of kilometers per day.

SUMMARY OF THE INVENTION

According to a first aspect of the present invention, there is provided a method of processing scanned image data to identify conductors in a network infrastructure, said data comprising a plurality of co-ordinate points in three-dimensional space, the method comprising the steps of:

(a) optionally, identifying co-ordinate points as potentially belonging to powerline conductors;

(b) dividing the data into a grid of cells, each representing a volume within the three-dimensional space and, for each cell:

(i) identifying sets of co-ordinate points from the potential co-ordinate points within the cell, said set being indicative of a set of identified substantially parallel vertical planes, each said plane representing a possible hanging catenary;

(ii) identifying a plurality of individual subsets of coordinate points from the set, each subset representing an identified vertical plane in the set of substantially parallel vertical planes;

(iii) analysing the distribution of co-ordinate points of a vertical plane to identify one or more vertical plane segments, including allocating to each vertical plane segment the coordinate points used in identifying that vertical plane segment;

(c) for the set of vertical plane segments generated by the analysis of all cells, aggregating the vertical plane segments into one or more linear runs, on the basis of one or more prescribed aggregation criteria; and (d) for the set of linear runs generated:

(i) defining co-ordinate points within each linear run as belonging to a particular span and circuit; and (ii) defining co-ordinate points within each circuit as belonging to a particular conductor.

The present invention is based on the identification of sets of lines with appear with common recurring patterns. This is in contrast to previous approaches, in which identification techniques have centred on identification of catenaries.

Step (a) is essentially a preliminary filtering step which may, under certain circumstances, be omitted, in which case the entire data set is then processed through the subsequent steps.

The 'volume' referred to represents a projection of a two dimensional cell area, e.g over a given vertical distance.

Preferably, step (b) (i) comprises applying a Hough transformation to the potential co-ordinate points in a projection of those points onto a horizontal plane.

Preferably, this step involves analysing coordinate points in $R,\theta$ accumulator space, and incrementing the accumulator for each $\theta$ and $R$ for each co-ordinate point in the data set that lies within that vertical plane, such that on completion of processing of all co-ordinate points the accumulators represent the number of coordinate points within each vertical plane, wherein $\theta$ represents the angular orientation of the plane in geographical terms and $R$ represents the distance to the plane from a prescribed position in the cell, the accumulator space maintaining values for all possible combinations of $\theta$ and $R$.

Preferably, sets of substantially parallel vertical planes are identified by summing the square of the accumulator within a tolerance band of each $R,\theta$ pair, the $R,\theta$ pair providing the highest result being identified as representing a central vertical plane of a set of substantially parallel vertical planes.

Further, this step preferably involves identifying sets of accumulators having peak values of similar θ with prescribed R separation, representing substantially parallel vertical planes with prescribed separation.

Preferably, step (b) (ii) comprises identifying individual local maxima in Hough accumulator space around the R,θ representing the identified central vertical plane. The 'local maxima' are those within the prescribed tolerance band of each R,θ.

Preferably, step (b)(iii) comprises a statistical analysis. This is preferably a statistical analysis of the distribution of co-ordinate points within each identified vertical plane, so to provide a set of ranked vertical plane segments, and may include allocating all the co-ordinate points from the highest ranked plane segment by removing from the data set, so as to eliminate false positives of the same plane. Preferably, the analysis process is then iteratively repeated with the reduced data set with respect to the remaining vertical plane segments, reassigning progressively lower rankings to the remaining planes, to identify the successively next prominent vertical plane segments. The repetition of this process continues until no vertical plane segment remains whose ranking meets a prescribed threshold.

The ranking may relate to parameters including linearity of co-ordinate point sets, uniformity of distribution of co-ordinate point sets, and gaps within co-ordinate point sets.

The method may include the aggregation of vertical plane segments with other vertical plane segments in accordance with defined criteria.

Preferably, step (c) comprises analysing the alignment and separation of the vertical plane segments and, as a result of this analysis, grouping plane segments into a set considered as a run. Preferably, this process involves allocating the highest ranked vertical plane segment to a first run with a nominal zero width, and adding to the first run all vertical plane segments which meet prescribed run inclusion criteria.

These run inclusion criteria may include: having substantially similar orientation (defined by θ value) within a prescribed range; and being no more than a prescribed distance away. The prescribed distance may be evaluated either longitudinally, representing the gap between the ends of planes, or latitudinally, representing the perpendicular distance between substantially parallel planes.

Preferably, the process of adding vertical plane segments to said first run includes adjusting the parameters of the first run in accordance with the new vertical plane segment. These parameters may include width, length and centreline position of the run.

Preferably, this step is repeated until no more vertical plane segments can be added to the first run.

The process can then be repeated to establish the second and all further runs.

Preferably, step (d)(i) comprises projecting all co-ordinate points allocated to vertical planes within a particular run to the centreline plane of the run, and analysing the projected points in the 2D space defined by that vertical plane. Preferably, this analysis is conducted by way of Hough analysis in 3D Hough space to identify catenaries and sets of vertically separated catenaries, so to allocate each identified catenary to a particular span and to a particular circuit.

Preferably, this process is carried out in a similar manner to the above-defined process of identifying parallel vertical planes.

Specifically, this step involves identifying catenaries and grouping those catenaries into catenary sets based on the location of the catenary vertex, defined in terms of $D_0$ (distance of vertex along the run) and H (height of vertex). Preferably, catenaries with proximate $D_0$ are allocated to the same span, whilst catenaries allocated to the same span but with H differing by at least a prescribed value are allocated to different circuits. In this way, all relevant coordinate points can be allocated to particular runs and circuits.

This process can then be repeated for each run.

Preferably, step (d) (ii) comprises carrying out steps analogous to steps (b) (i) to (b) (iii), but instead of applying the process to each cell in a grid of cells, it is applied to the points allocated to each span or circuit from step (d) (i) to establish a set of vertical planes each containing a single catenary, and thus a single conductor.

Preferably, the method includes the step of repeating step (d) (ii) on all points allocated to each individual conductor vertical plane, to result in defined single catenaries representing individual conductors.

Preferably, the method includes the further step of uniquely identifying and characterising each individual conductor.

Preferably, this step comprises a least squares regression technique to determine the best fit catenary parameters.

Preferably, the positions of end points of the conductors is determined by calculating intersect points between immediately adjacent conductors.

The method may further include the identification of powerline poles by analysing points not associated with conductors in the proximity of the end points of the conductors.

Preferably, a priori and/or a posteriori information regarding the powerline poles is used to refine the positions of end points of the conductors.

According to a further aspect of the present invention, there is provided a method of processing scanned image data to identify conductors in a network infrastructure, said data comprising a plurality of co-ordinate points in three-dimensional space, the method including:
  analysing the co-ordinate points to identify sets of co-ordinate points indicative of a set of substantially parallel lines; and
  analysing the co-ordinate points on the basis of said identified substantially parallel lines thereby to identify and map hanging catenaries representing said conductors.

The substantially parallel lines may represent substantially parallel vertical planes, or may represent substantially parallel vertically separated hanging catenaries.

The above methods are preferably directed at identification of electrical powerline conductors. However, it will be understood that it may equally be applied to other network infrastructure involving runs of hanging catenaries, such as fibre optic cables and other communication lines.

According to a further aspect of the present invention, there is provided a computer software product including logic functionality to carry out the above method when provided with a scanned image data set, and including logic functionality to output data representative of identified conductors in a network infrastructure.

According to a further aspect of the present invention, there is provided a computer-based system for processing scanned image data to identify conductors in a network infrastructure, the system including:
  data input means to receive scanned image data;
  a processing unit configured to carry out the above defined method; and
  output means to provide data representative of identified conductors in a network infrastructure.

The invention thus allows the mapping of electricity transmission and distribution systems and similar network infrastructure, being the system of components (towers, poles, conductors, etc.). Accurately recording the line catenaries is extremely valuable, for use in line re-engineering, identifying changes over time (to action appropriate further analysis or intervention if prescribed physical changes are detected) and identifying possible encroachments of vegetation to conductors.

The invention lends itself to a wide spectrum of commercial applications for electricity transmission and utilities companies, or for services to an asset owner with infrastructure interests in the proximity of a distribution or transmission utility. For example, the resultant conductor segment data can be used by asset owners to automatically correlate data from progressive LiDAR passes, thus reducing or eliminating the need to ground truth data in processing large scale environments.

BRIEF DESCRIPTION OF THE DRAWINGS

Preferred embodiments of the present invention will now be further explained and illustrated by reference to the accompanying drawings in which.

The invention will now be further explained and illustrated by reference to the accompanying drawings in which.

DETAILED DESCRIPTION OF THE DRAWINGS

The method described below illustrates an embodiment of the invention, and involves the acquisition and processing of dense LiDAR point cloud data using a graphics processing unit (GPU) to detect and parametise powerline catenaries, recognising their correlation as a set to reduce the need for human assisted interpretation. This approach is targeted for affordable interpretation of up to around 1000 km of powerline per day by a single human operator, although this can be increased in accordance with available processing power and operators. The methodology involves a multistage process to recognise each powerline in progressive detail, beginning with runs (also referred to as 'corridors', relatively long, nominally linear segments of network), to circuits (separate individual electrical circuits within a run), to spans (segments of circuits between two successive poles), to conductors (individual powerlines identified as catenaries within a circuit). The algorithms for each stage are devised for specific coding within a GPU environment rather than in a conventional CPU environment. However, the present invention could be implemented in a CPU environment of sufficient power. To illustrate the features of typical powerline assets: transmission run, conductors, poles and cross-arms are shown in FIG. 1A referenced 14, 50, 62 and 60 respectively.

Figure 1A:
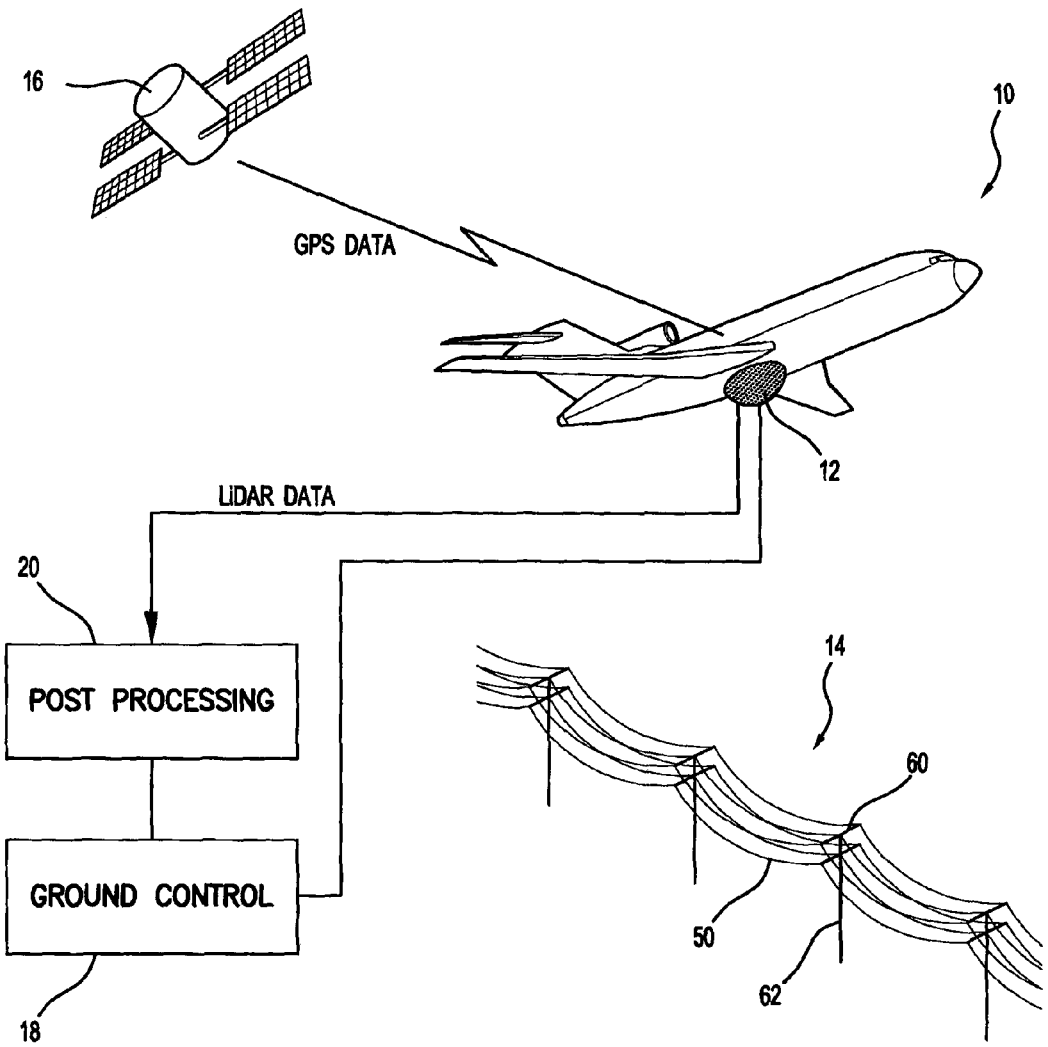
FIGS. 1A and 1B provide a diagrammatic representation of the process of acquisition of LiDAR data from an aircraft.

As further illustrated in FIG. 1A, Airborne Laser Scanning (ALS) is used to acquire a mission data set. The data may be acquired in any suitable manner, such as by overflying the terrain of interest (at a height of around 500 m) with an aircraft 10 (helicopter or fixed wing, manned or unmanned), monitored (if required) by ground control 18 and equipped with a LiDAR scanner system 12. LiDAR scanner system 12 is configured to emit laser pulses at a given interval and measures the travel time between the emitted and reflected pulse, from which the distance to the first and suitably differentiated subsequent objects illuminated by the light pulse can be computed. The laser beam is continuously swept in a direction transverse to the direction of flight, resulting in a zigzag pattern of points as the aircraft travels forward. Aircraft 10 is also equipped with inertial monitoring systems and with GPS instrumentation synchronised with GPS satellite 16, so that the position and orientation of scanner system 12 is known.

Figure 1B:
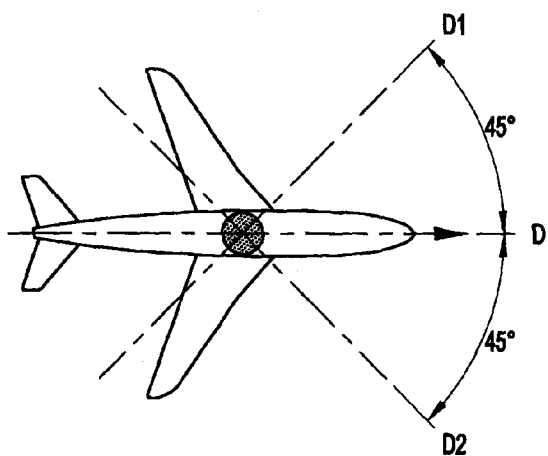

In a preferred data acquisition technique, aircraft 10 is equipped with two LiDAR scanning systems, or two systems to sweep (eg. by deflection) a LiDAR pulsed laser beam, arranged such that the two systems sweeps beams in mutually orthogonal directions, both in a sweep plane arranged at 45° from the direction of aircraft travel D, as illustrated by sweep planes D1 and D2 in FIG. 1B. This is to ensure that no straight line feature, such as a powerline segment, can inadvertently be missed by the LiDAR data acquisition in the event that it is arranged parallel to the sweep plane. If it lies parallel to one sweep plane, then its acquisition by the scanning process in the orthogonal sweep plane is assured.

Ideally, the sweep planes are angled from the vertical in mutually opposite directions, so providing a forward and backward visibility of vertical faces and allowing acquisition of at least some data points that might otherwise be obscured, such as by vegetation, roof eaves overhang, etc.

For improved accuracy, all inertial and GPS data may undergo subsequent post processing through correlation to published satellite orbit information and atmospheric correction signals.

Figure 2:
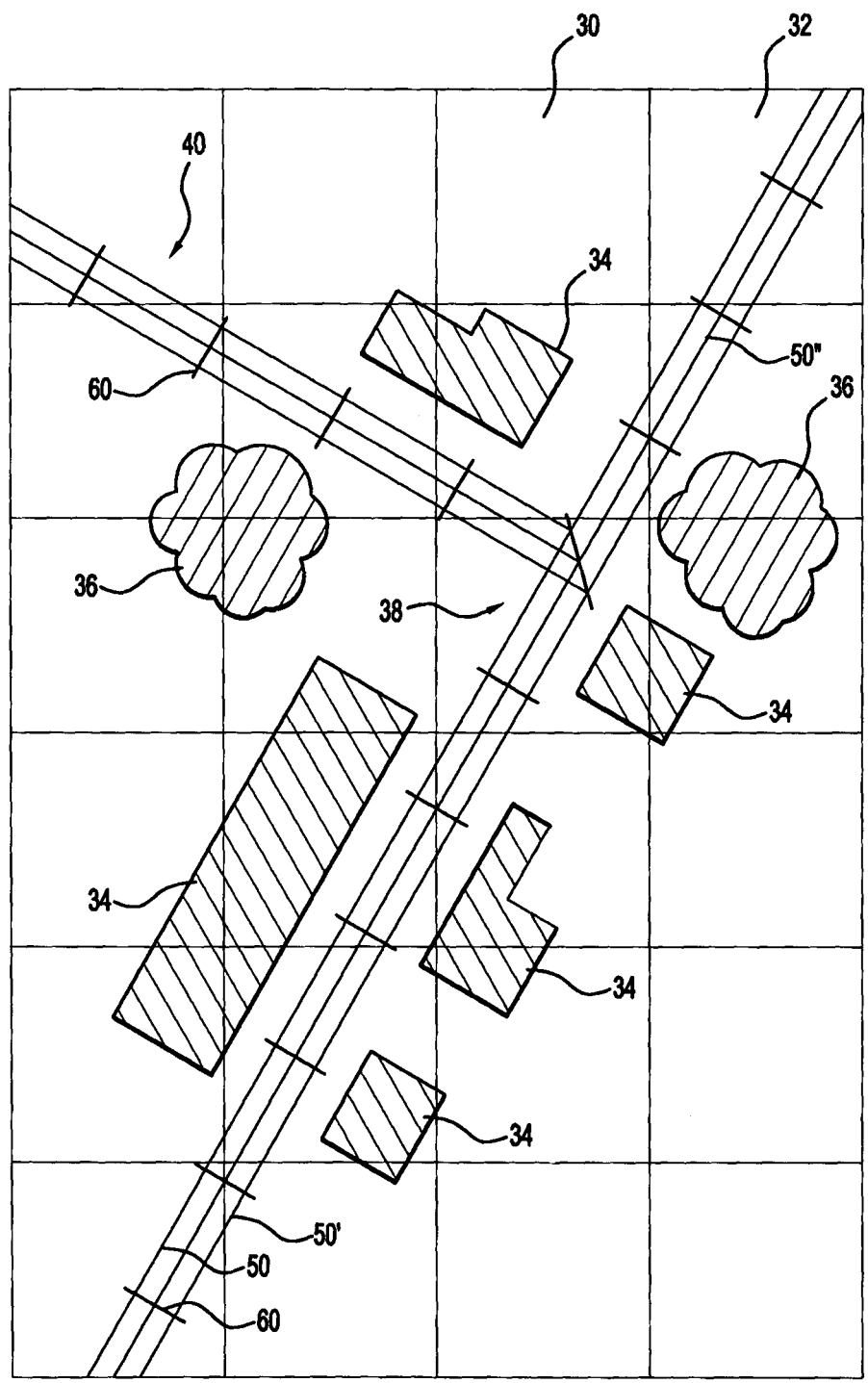
FIG. 2 is an illustration of a ground area of analysis, showing vegetation, ground, and man made structures including buildings and distribution powerline runs.

Typical features that will be imaged by the LiDAR scanner system overflying an area of interest are shown in FIG. 2. This area is notionally subdivided into a plurality of cells of fixed area 30, 32, etc., discussed further below. FIG. 2 shows buildings 34, vegetation 36, a first powerline run 38 and second powerline run 40, the second run being a branch from the first. Each powerline run includes conductors 50, 50' and 50" mounted by way of insulators on cross-arms 60 supported by poles 62.

It is to be noted that a powerline run can consist on occasions of single catenary circuits, most commonly for service wires which span the distance from a building to a powerline.

Figure 3:
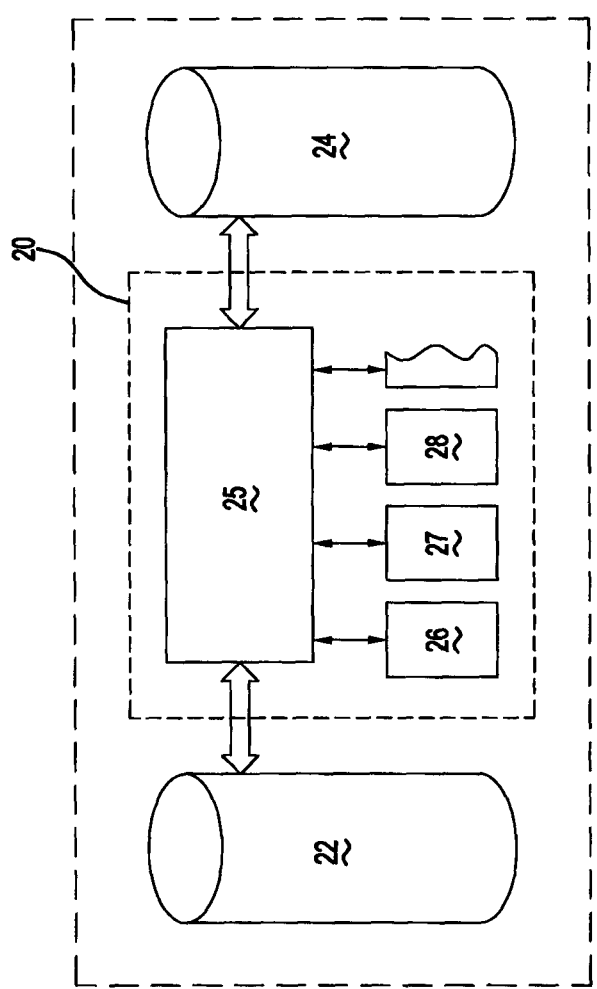
FIG. 3 is a schematic showing the functional modules of the post processor unit used for processing the acquired data.

Post processing of the acquired data takes place in a post-processing unit (PPU) 20 within a parallel GPU environment. As shown in FIG. 3, PPU 20 includes or is in communication with a point database 22 and an object database 24, and includes CPU 25 and multiple parallel GPUs 26, 27, 28 etc. The CPU coordinates the flow of data from the point database to each of the GPUs for processing and storing the output data in object database 24.

Figure 4:
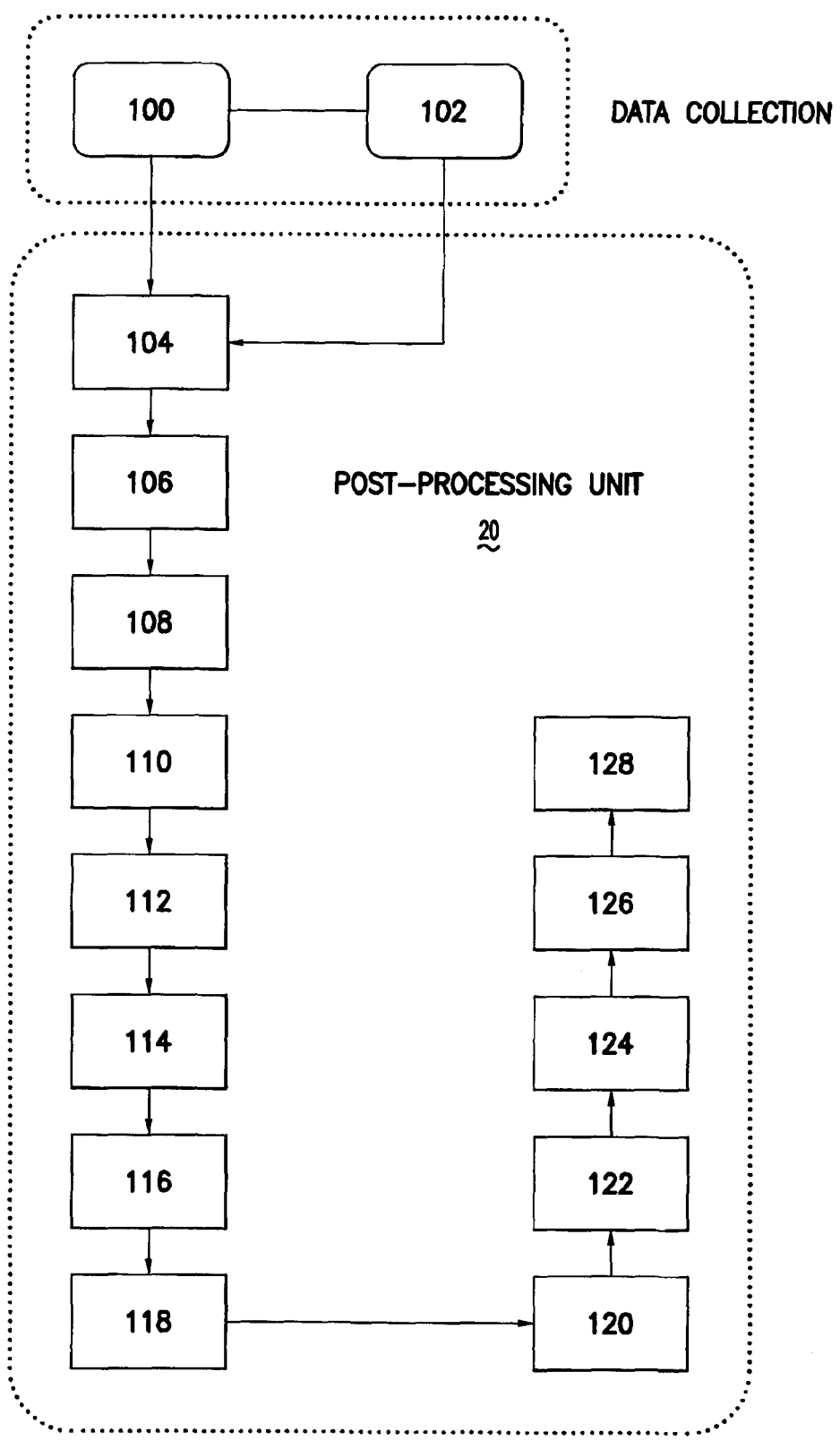
FIG. 4 is a flow diagram of a data acquisition and processing method carried out in accordance with the invention.

The flow chart of FIG. 4 shows acquisition of the raw LiDAR data set 100 and acquisition of aircraft metadata (including GPS and inertia data) 102, this data captured on aircraft 10 and stored on discs to be passed to PPU 20 for subsequent processing. Alternatively, the data may be streamed (or stored data transferred) from aircraft 10 to PPU 20 by suitable wireless communications means.

The post processing of the GPS data is carried out with the knowledge of ground-based continually operating reference stations (CORS), in order to improve the accuracy of GPS positioning. This may be done by way of data feeds from locally proximate reference stations to ensure maximum (and preferably real-time) accuracy. If a CORS infrastructure is not readily available, retrospectively published satellite location and global atmospheric correction signals (i.e. post processing positioning adjustment) can be used to establish decimeter global accuracy.

The first step 104 is to process the acquired raw data set of polar coordinates with reference to the GPS data to produce a 3D cartesian coordinate (easting, northing, height—x, y, z) for each scanned point.

The resulting data set is referred to as the 'point cloud', and consists of a plurality of 3D coordinates with, seen in plan view, a density of around 30-40 points per square meter, or more.

The next step 106 is to process the point cloud data in order to identify and classify the data points that relate to ground and building points, by use of a suitable technique, such as a surface or plane detection technique. Various algorithms of different levels of complexity and performance will be known to the skilled reader and will not be described here in detail, such as those discussed in "A Comprehensive Automated 3D Approach for Building Extraction, Reconstruction, and Regularization from Airborne Laser Scanning Point Clouds", Peter Dorninger and Norbert Pfeifer, Sensors 2008, 8, 7323-7343, ISSN 1424-8220 (www.mdpi.com/journal/sensors), and in US Patent Publication 2004/0041805.

The remaining data set (i.e those points not classified as relating to ground and building points) are then analysed at step 108 to identify and classify all potential powerline points, by use of any suitable optimistic method. Such algorithms will be known to the skilled reader and will not be described here in detail. For example, all points located below a first ground height and all those located above a second ground height may be stripped from the dataset, and/or isolated outliers may be removed from the data set. This enables removal of points belonging to fences and to the ground itself. The resulting data set will include many false positives, of course, but this course filtering step significantly reduces the data set to be processed.

Processing Unallocated Points in Plan View

The steps described in this section are carried out on the unallocated data set in plan view, in other words only with regard to the x, y coordinates. A straight line identified by the algorithm therefore represents a vertical plane, which may correspond to a hanging catenary.

As discussed above with reference to FIG. 2, the entire ground area covered by the mission data set is divided into a regular grid of square cells 30, 32, etc., each cell in the grid indexed in the east and north direction. It should be noted that the grid may be a subdivision of a single flight run within an entire mission, there is no need to pre-align parallel flight runs as is the conventional approach for this type of work.

The process uses overlap between neighbouring cells, to provide a buffer zone around each cell and thus avoid discontinuities between cell boundaries. A set of conductors positioned at the edges or at the corners of neighbouring cells may not have enough points within a single cell to lend themselves to ready identification by detection algorithms. The inclusion of a buffer zone that extends as far as the centroid of the directly neighbouring cells means that an object at the corner of one cell will be at the centre of a neighbouring cell, so avoiding this potential problem. As the skilled reader will understand, the process used for reforming runs from plane segments means that the duplication of planes resulting from this significant overlap buffer does not impact in any significant way on the efficiency of the algorithm.

For each cell, at step 110, the coordinate system for the points within the cell is transformed to an origin defined as the centre of that cell.

Next, at step 112, the Hough Transform is used to map the points in the cell into Hough Space ($\theta$, R). The Hough transform is a technique used in image analysis to extract features. The technique can be used to find imperfect instances of objects within a certain class of shapes by a voting procedure, carried out in a parameter space, from which object candidates are obtained as local maxima in 'accumulator space', constructed by the algorithm for computing the Hough transform. The 'classical' Hough transform was developed to identify straight and other lines in an image, but the Hough transform has since been generalised and can be extended to identifying other shapes, such as circles and ellipses. The Hough transform is described in detail in U.S. Pat. No. 3,069,654 to Paul Hough.

In accordance with the method of the invention, within the bounds of a rectangular grid across the Hough Space, the grid spacing (i.e. the size of the Hough Space accumulators) is selected in accordance with the width of a typical power line circuit in the R axis, and the values are summed in the Hough Space accumulators. Selection of the grid spacing is preferably less than the expected error in point location; this allows for scores to be added to neighbouring R-values in order to better locate the centre of a scattered set of near-colinear points.

A set of parallel or near-parallel lines in Cartesian space will be represented in Hough space by a set of local peaks in cells with similar $\theta$, separated by an R representing the spacing between the lines. Summing the square of the accumulator values in all neighbouring Hough cells for each cell in the entire set affords identification of the set of peaks. The highest value cell will indicate the parameters of a centreline of a line or set of parallel lines, being likely candidates for a powerline run or alternatively a single conductor. This is referred to as the 'peak set'.

The peak set data is then used to distinguish and uniquely identify individual peak lines. To do this, the process flags all points within the vicinity (defined by a prescribed number of Hough Space accumulator cells) of a local peak (ie. a point having a higher value) as not peaks. Points within the vicinity of a local peak which have the same value as that local peak are identified as belonging to a plateau. Plateau points that neighbour with higher local peaks are defined as non-peaks. All remaining points and plateaus are peaks. The centre of gravity of a plateau is flagged as the location of a peak.

Figures 5, 5A:
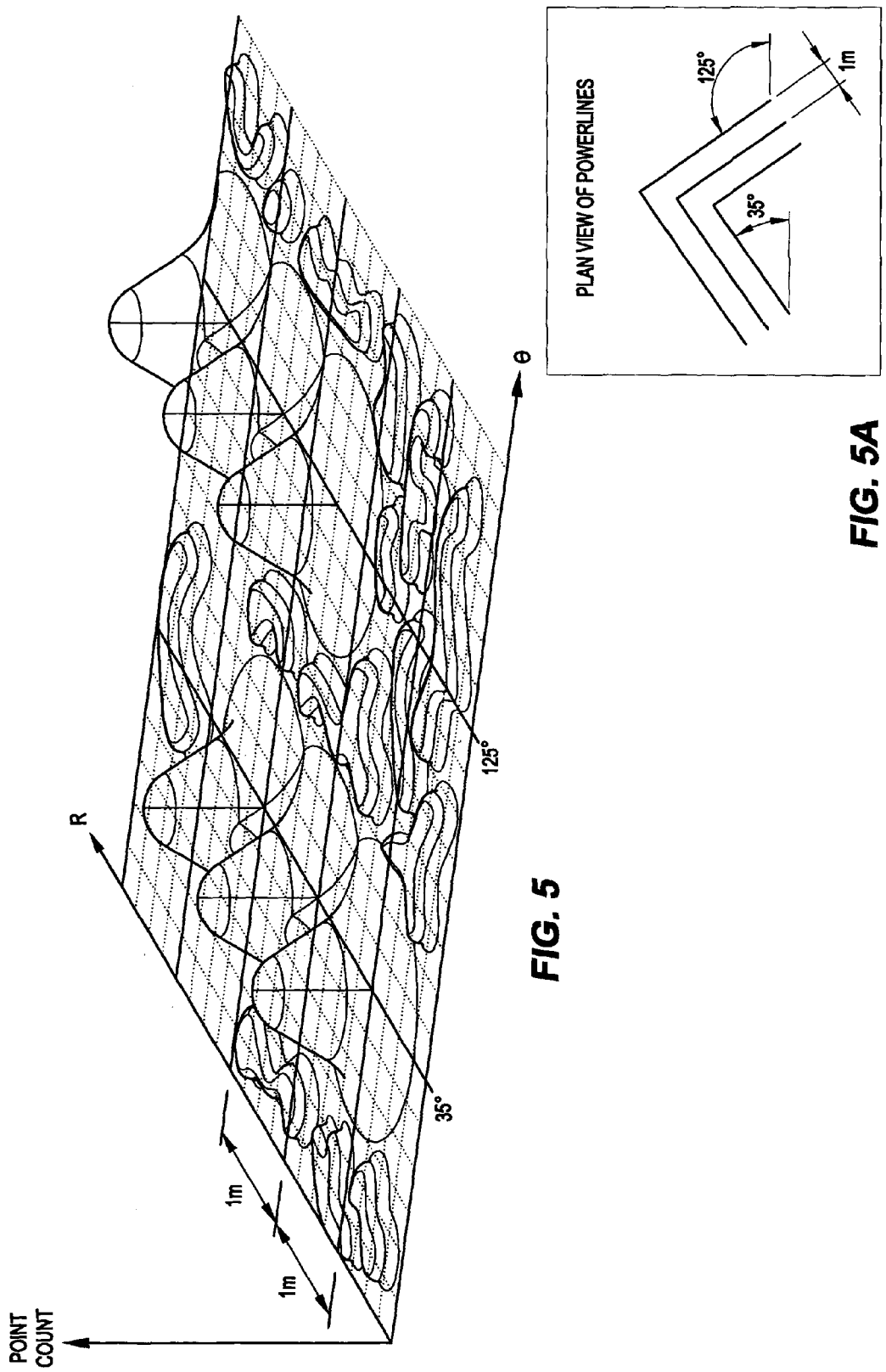
FIG. 5 diagrammatically represents the process of uniquely identifying individual lines in Hough accumulator space.

This process is diagrammatically represented in FIG. 5, and explained further below, with reference to identification of two sets of parallel lines containing three lines each (mutually spaced by 1 m), one at 35° and the other at 125° (see FIG. 5A). The z-coordinate is the point count, giving rise to the relief geography of the Hough Space.

Each point in the coordinate data set associated with a power line catenary will exist in a vertical plane with other points on the same catenary. Multi-wire circuits will often have spans in which the wires within the span are near parallel. The existence of near parallel vertical planes is a distinguishing feature of powerline circuits within the coordinate data set.

As discussed above, any vertical plane in the data set under analysis can be defined with the two parameters θ and R, θ being the angular bearing of the plane in geographical terms and R being the distance to the plane from the centroid of the grid cell under analysis. The plane will be considered to have a thickness (allowing for point error) determined by the resolution of R. The angular precision is determined by the resolution of θ.

An accumulator space is created to maintain values for all possible combinations of θ and R given predetermined resolutions for each. The accumulator for each θ and R (each R,θ pair) is incremented for each point in the coordinate data set that would exist within that plane. At the completion of processing each point in the data set, the accumulators therefore represent the number of coordinate points within each respective plane.

Any sets of coordinate points in parallel planes are thus contained within accumulators with similar θ but varying R. The separation between parallel planes is a variable determined by powerline construction standards.

Therefore, any set of accumulators with high values of identical or similar θ with appropriate separation of R are likely planes containing parallel powerline catenaries. The R,θ pair which represents the centre line of a set of a parallel lines can be found by summing the square of all accumulators within a tolerance of each θ and R (given a tolerance of θ to allow for insulator location variation and conductor transpositions, and given a tolerance for R to allow for total width of potential circuit). The highest sum across all possible θ and R represents the parameters of the centreline of the strongest set of parallel lines.

It is then necessary to identify the individual planes (θ and R) pertaining to each individual parallel line represented by the peak identified in the previous step. This is conducted by examining all accumulators within the prescribed tolerance of θ and R pertaining to the centre line of the set of parallel lines. The values of these accumulators will form a set of peaks and troughs across the coordinate space of θ and R. All planes will have different point counts and hence their accumulator space will show different peaks. Planes containing low point counts can often be significantly overshadowed by planes with a powerful peak (potentially representing a new conductor). Identification of all planes thus requires identification of peaks, and as discussed above accumulators with lower values than neighbour accumulators do not represent peaks and are eliminated from the peak set. All accumulators with a value equal to an eliminated neighbour are similarly eliminated. The resultant accumulators are thus potential peaks whose θ and R values represent potential parallel planes. The number of potential peaks returned will exceed the actual number of parallel planes and thus will need further reduction.

For each of the potential planes an analysis of the distribution of coordinate points within the plane is conducted, in order to eliminate false positives. Many of the planes will be false positives for the same plane or will have a Hough point count artificially higher due to a point being shared by multiple intersecting or closely proximate planes, and thus will include many of the same coordinate points. All planes are examined for linearity of coordinate point sets, uniform distribution of points sets and minimal gaps within point sets. These and other characteristics of points within each plane are used to weight and thus rank the planes. The plane with the highest ranking is considered a verified plane and the coordinate points associated with it are removed from the data set. A plane is given a defined start and end location based on the space over which the coordinate data meets continuity and/or uniformity standards.

An analysis of the remaining planes is then repeated with the reduced point sets. False positives of the first plane will generally rank lowest, due to the fact that a significant number of 'overlapping' points have been removed. The next highest ranking plane is considered a verified plane. The process is repeated until no plane remains whose weighting meets a prescribed threshold.

Each unique R now represents a likely parallel line (i.e. a vertical plane) of angle θ. Each line from the peak set is processed in order of weight, LiDAR points being progressively allocated to each line identified.

The process of ranking planes and finding start and end points is performed as follows:

All previously unallocated points in the cell within a defined distance of that line are identified and sequenced. Along the sequence of points, sets of points with regular interval spacing are selected, where the interval spacing does not exceed a set parameter. These are defined as line sub-segments. The line sub-segments are sequenced and aggregated into line segments where the separation of sequential sub-segments does not exceed defined parameters.

Figure 6:
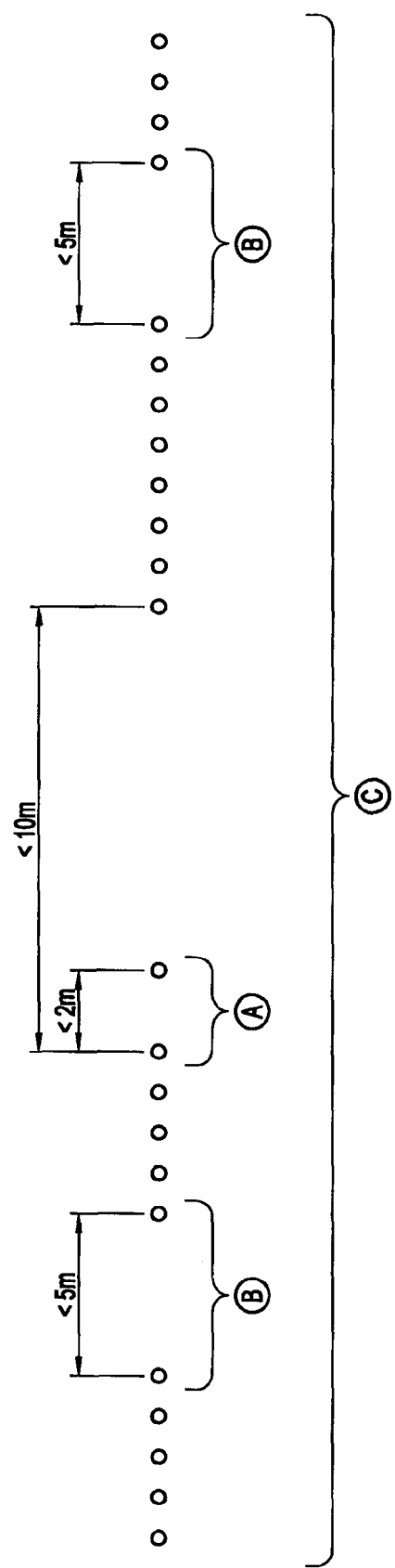
FIG. 6 represents the sequencing and aggregation of line sub-segments into line segments in accordance with prescribed parameters.

This process is represented in FIG. 6, the defined parameters used being:

A No point can be more than 2 m from a set of points for inclusion into that set.
B Two sets can be no more then 5 m apart.
C If two segments are separated, the lines can be joined if the separation is less than 10 m.

Clearly, other parameters may be chosen, in accordance with various factors such as point density, diameter of scanning beam, expected dimensions of obstructions, etc.

The above process is then repeated for n levels of depth of sub-segmentation. The resultant segments are weighted on the basis of the number of points within the segment, and the maximum weighted line segment is selected as the segment if its weighting passes the threshold, otherwise this line segment is considered a false positive. In other words, by way of this step, the statistical correlation of points with the plane gives the plane its success rating.

Allocating Points to Line Segments—Step 114

All points within a defined proximity of the successfully defined line segment are then assigned to the line segment. These allocated points are considered removed from the data set to be further processed.

Figure 7:
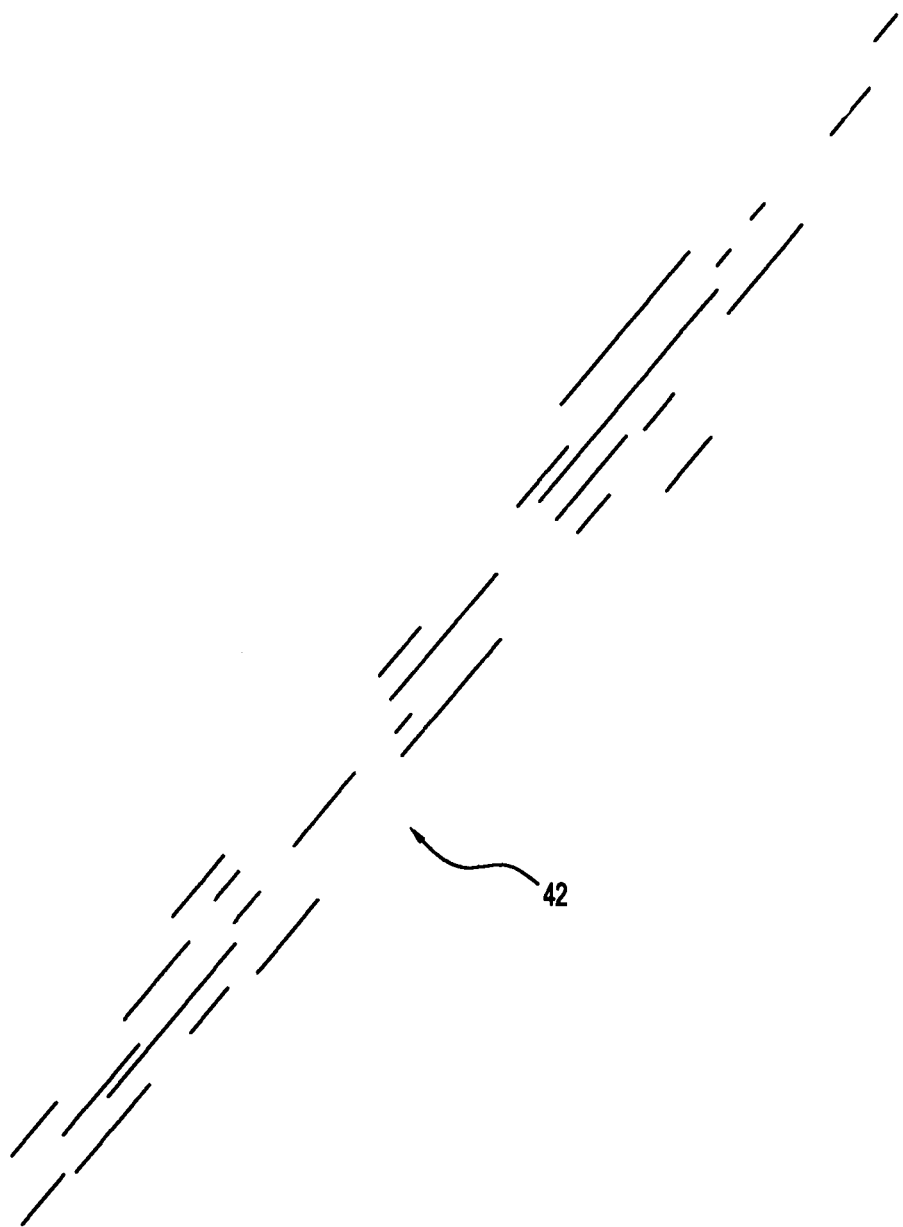
FIG. 7 represents of a set of parallel and near parallel line segments identified by a method according to the invention.

The cell is then reprocessed until no more significant line segments are found. A resulting line set is depicted in FIG. 7. The broken lines illustrated represent missing data points, which may for example be caused by vegetation or other objects concealing sections of conductors.

Allocating Lines into Runs—Step 116

Having processed all cells, the entire set of line segments generated by the analysis of all of the cells is analysed, and the line segments allocated into linear runs, which represent powerline corridors. This is done by way of an evaluation of the plane segments for alignment in order to group similar planes segments into a contiguous set considered a corridor. This is carried out as follows:

The most heavily weighted plane segment is identified and defined as the centre line of a new run, by its allocation to an arbitrary run of zero width. All planes meeting the following criteria are added to the run:

The θ of the plane segment is within a prescribed tolerance range of the θ of the centreline of the run.

The plane segment either overlaps longitudinally with the run, or its closest end point is no more than a prescribed maximum distance from it.

Either end of the plane segment is no more than a specified perpendicular distance from the centreline of the corridor.

In this way, all other near parallel or near parallel line segments are identified and allocated to that run. After each plane is added to the corridor its parameters (width, length and centreline) are adjusted to account for the addition of the new plane. The run centreline is recalculated from the average of the lines allocated to that run. The process is then repeated, checking for new lines that can be aggregated into the extended run, until no new lines can be added.

The above process is repeated until all line segments have been added to runs. An isolated line is treated as an isolated run with a thickness equal to that of the point distribution within the line. This will occur with service wires and for single wire earth return (SWER) systems.

Various techniques can be used in this step to weight runs, to assist in identifying false positives. For example, a run consisting of strong parallel lines will be given a high weighting. A long single line run will be given a high weighting. Runs that intersect may be given a high weighting. Other factors increase the weighting of a run, such as a determination that it connects to a building.

Figure 8A:
FIGS. 8A to 8D illustrate the steps of identifying individual catenaries in a distribution powerline run in a method according to the invention.

FIG. 8A illustrates a typical segment of a powerline run in plan view with three conductors 50, 50' and 50" supported by cross-arms 60. It will be understood that one conductor 50 (or part thereof) may be closely superimposed over a lower conductor (see FIG. 8B), and therefore the identification of an apparently continuous line segment does not mean that all the data points in that line necessarily belong to the same conductor.

Identifying Circuits—Elevation View—Step 118

Figure 9:
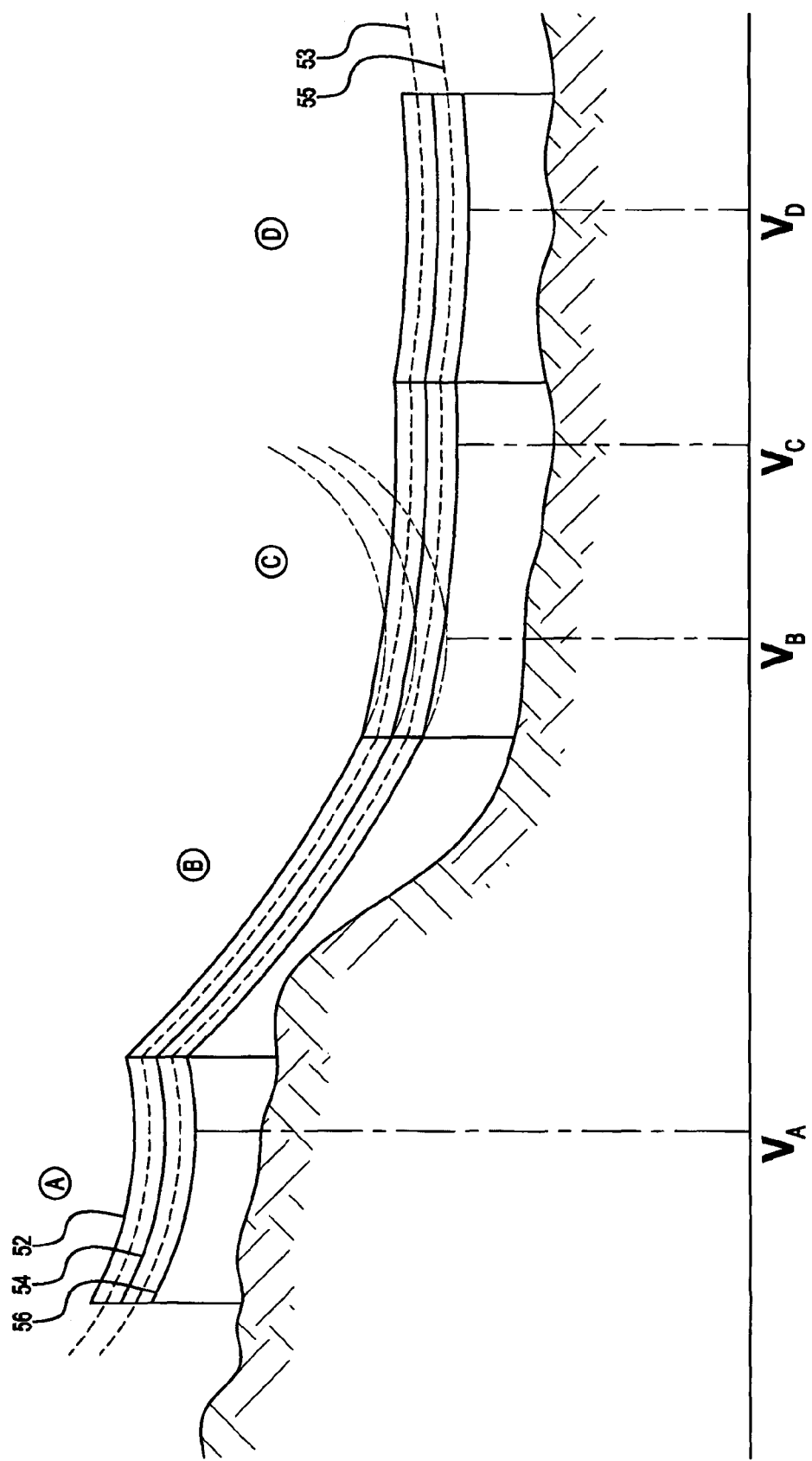
FIG. 9 illustrates the process of allocation of catenaries into a succession of spans, and the subsequent allocation of catenaries within a span to a circuit.

Having generated all runs, the complete set of catenaries within each run is extracted for subsequent analysis and grouping into spans and circuits (a span being a segment of a run between two neighbouring poles, containing a set of catenaries that share similar vertex locations along the run—see FIG. 9, and further description below).

A circuit is a set of conductors operating together to deliver power (ie. carrying the same voltage). Typically, conductors within a circuit will have a closer height profile to each other than to conductors in a separate circuit. The process therefore views all points allocated to a run in elevation view, ie. in side projection. Vertical planes (lines, as considered in the previous step) are no longer of relevance, as they were merely a means by which runs could be identified.

This step (and the subsequent steps) thus commence from the projection of all points allocated to planes within a run to the centreline plane of the run, and the analysis of the projected points in the 2D space of the centreline plane to identify catenaries in that plane formed by the superimposition of all catenaries within the run, using Hough Space analysis (or any other suitable analysis technique).

The equation of a catenary in Cartesian coordinates has the general form:

$$y = a\cosh\left(\frac{x}{a}\right) = \frac{a}{2}(e^{x/a} + e^{-x/a})$$

Each run is examined in isolation, performing the following steps.

Firstly, the start of the run is established as the run origin. D is the distance along the run from the origin, H the vertical height of the coordinate point in the run, as defined in a suitable height reference system.

For analysis, the run is divided into longitudinal overlapping sections each of 100 m in length. Each section is buffered by a length of 50 m, with the result that each point is in fact analysed twice. Points at the extremities of one analysed section will be at the centre of the next, thus giving each point equal opportunity to be weighted with its neighbours. This approach of using overlapping linear sections ensures that all points are considered with sufficient surrounding information to enable identification of the catenaries present. However, it will be understood that the technique will result in duplication of catenaries, and a suitable de-duplication process is therefore subsequently employed.

All points in the prescribed first length section of the run are selected for analysis in the coordinate system D, H. All D, H points are transformed into a 3D Hough transform space with the coordinate system C, A, $D_o$. The value of the cell at any C, A, $D_o$ is the number of points in the catenary defined by the parameters C, A, $D_o$ in the following equation.

$$H = A * \cos h((D-D_o)/A) - A + C$$

C is the height of the catenary vertex, $D_o$ is the offset from run origin to the catenary vertex, and A defines the catenary shape, dependent on the length of the wire and the span width.

The 3D Hough space will contain clusters of high count cells surrounding the cell with the parameters defining a catenary. Catenaries belonging to the same span will have similar $D_o$. In many urban environments, multiple circuits exist on the same infrastructure. These will be recognisable in the 3D Hough space as multiple clusters of high value cells with similar D and similar A but with a separation in H.

A preferred method for finding the vertex $D_o$ parameter for a catenary or set of catenaries is to raise to any power (eg. cubing) all cell values, so to accentuate cells which have a high point count. Other suitable methods can be used to identify clusters of points, such as through the application of convolution.

Summing the raised cell values for every $D_o$ highlights the $D_o$ values which represent high counts. These become the potential distances from the origin to the vertices of spans. For all those $D_o$ values that are potential vertices the cube of cells are summed for all C values. This highlights the vertical offsets for the given $D_o$ for which a vertex exists.

For all $D_o$ and C pairs, the A with the highest cell count is likely to represent the shape of the catenary at that $D_o$, C vertex location.

After processing the entire run, the resulting set will include a number of false positives. A statistical analysis of point distribution is therefore then used to weight catenaries. Catenaries are examined to identify a set that is consistent and provides the best point coverage, as defined by prescribed criteria. For example, false positives will include catenaries which intersect other catenaries already confirmed, and those which skip what have been identified as spans.

The points associated with the highest weighted catenary are removed from the unallocated coordinate point set. All remaining catenaries are statistically re-weighted with the now reduced point count. The process continues until there is no catenary remaining which exceeds a prescribed threshold.

Figure 8B:
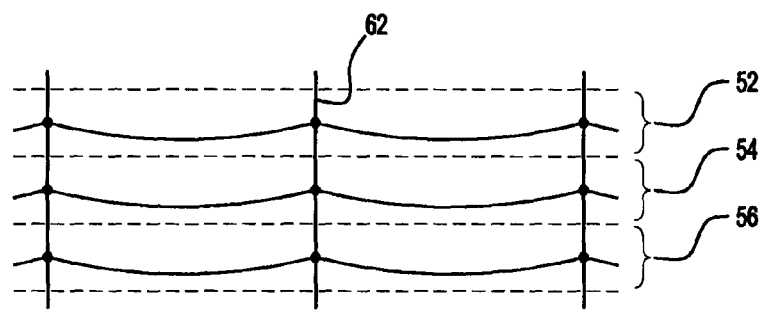

FIG. 8B illustrates conductors belonging to three different circuits, respectively 52, 54, 56. For example, these may be, respectively, a 3-phase 66 kV transmission circuit, a 3-phase 11 kV distribution circuit, and a 3-phase 4 kV distribution circuit. A single communication cable (not shown) may be included, suspended below the power circuits.

This process also calculates the approximate vertex of the set of catenaries in each circuit, allowing an estimate of span size and the creation of a span object (see below, with reference to FIG. 9).

Once catenaries have been assigned to spans, sets of catenaries within a span that are significantly separated in H are considered to be separate circuits. Circuit objects can thus be created and allocated to catenaries.

Once all points allocated to all lines within a selected run have been selected, the distance D along the run and the height of the point H is used to map the vertical spacing between all points that are horizontally within a prescribed distance of each other. These points are filtered into clusters of vertical spacing. The points are separated by their relationship to each cluster. This enables all the points within a run to be allocated to a circuit 52, 54, 56 within that run, and for the spans to be created for that run. FIG. 9 illustrates the process of separation of circuits into successions of spans A, B, C, D, having vertices $V_A$, etc. In this case, due to the ground slope, the vertex of the conductors of span B falls outside the span (the dotted lines show the continuation of the catenaries of the conductors of span B). It will therefore be noted that the spans at this stage do not necessarily align with poles, but the object count allows the identification and creation of spans. Dashed lines 53, 55 represent nominal 'circuit separators' between circuits 52, 54, 56.

Identifying Individual Conductors—Plan View—Step 120

Figure 8C:
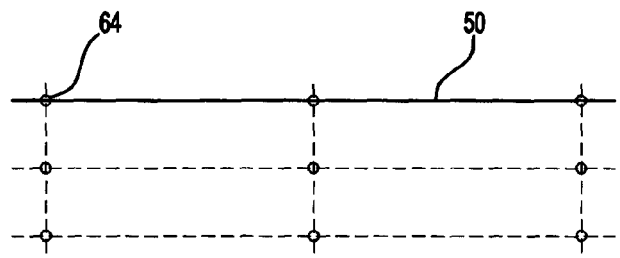

In order to identify single conductor lines, the Hough Transform is re-run in plan view (ie. considering, for all points in a single circuit and around a span, only the projection of those points onto a horizontal plane) in order to find each straight line segment. FIG. 8C illustrates the creation from this analysis step of single conductor 50.

In effect, then, this step repeats the process described above for identifying vertical planes, but now for each run span and for each circuit.

Identifying Catenary for Each Conductor—Elevation View—Step 122

For each single line identified in the previous step, the Hough Transform is applied in the vertical plane to each span, in order to identify the parameters of the catenary comprised by that conductor.

Figure 8D:

The end result of this process is each catenary 50a, 50b (FIG. 8D) identified and recorded by its parameters (position of vertex, length, direction, shape equation) with reference to the circuit in which it is comprised and the run in which that circuit is comprised.

Each individual conductor may be identified using a least squares regression technique to determine the precise parameters of the catenary of best fit for each conductor. The likely start and end points of each conductor are found by intersecting each catenary with the next successive catenary.

Further Processing

From the catenary information, at step 124, the intersection of sequential catenaries is used to find the likely location of attachment points 64. The arrangement of attachment points is then matched by way of a database to a standard configuration, allowing location of cross-arms and poles.

At step 126, selected relevant unallocated LiDAR points (ie. those not classified as part of the conductors but close to the intersections of successive conductors) can be assigned to the closest cross-arm or pole, to further refine the position of the pole and the cross-arm. In particular, the centroid of these points can be taken as the centre line of the pole or cross-arm, and using a priori information regarding poles and cross-arm structures this information used to refine the position of the ends of the conductors.

At step 128, each conductor, bay, circuit and run is labelled according to a prescribed set of rules that allow consistent relabelling. Conductors are labelled from left to right when looking up each line (increasing distance D), circuits are labelled from bottom to top, span in order of increasing D along the run.

Such a labelling methodology allows for the consistent generation of labels for the same objects captured during subsequent data acquisition (from a later flight run) and processing. This provides for the ability to correlate between data sets. For example, the variance in the location of the vertices of the catenaries provides a correction vector that can be used to align all points in a subsequent flight run to an earlier flight run.

From the above detailed description, the skilled reader will appreciate the particular approach of the technique devised by the inventors. In marked contrast to most previous approaches, the technique is not based on identification of catenaries. Instead, the technique of the invention centres around the identification of sets of lines with appear with common recurring patterns. These patterns are:

one or more pluralities of parallel or near parallel lines— when viewed in plan view (each line representing a vertical plane, and hence potentially a hanging catenary);

one or more pluralities of repeated catenaries (as defined by their catenary parameters)—when viewed in elevation view.

This approach recognises that conductors are most usually to be found in these particular patterns. Determination of either of these patterns thus provides a weighting basis on which to further process the coordinate point data, to positively identify conductors and allocate them to their particular part of the overall infrastructure.

It is to be noted that, throughout the description and claims of this specification, the word 'comprise' and variations of the word, such as 'comprising' and 'comprises', is not intended to exclude other variants or additional components, integers or steps. Modifications and improvements to the invention will be readily apparent to those skilled in the art. Such modifications and improvements are intended to be within the scope of this invention.

The invention claimed is:

1. A method of processing image data obtained from scanning a network infrastructure in order to identify conductors in the network, said image data comprising a plurality of co-ordinate points in three-dimensional space, the method comprising the steps of:
  (a) dividing the image data into a grid of cells, each representing a volume within the three-dimensional space and, for each cell:
    (i) identifying sets of co-ordinate points from potential co-ordinate points within the cell, each said set being indicative of a plurality of identified substantially parallel vertical planes, each said plane representing a possible hanging catenary;
    (ii) identifying a plurality of individual subsets of coordinate points from each set, each subset representing an identified vertical plane in the plurality of substantially parallel vertical planes;
    (iii) analysing the distribution of co-ordinate points of a vertical plane to identify one or more vertical plane segments, including allocating to each vertical plane segment the coordinate points used in identifying that vertical plane segment;

(b) for the one or more vertical plane segments generated by the analysis of all cells, aggregating the vertical plane segments into one or more linear runs, on the basis of one or more prescribed aggregation criteria; and (c) for the one or more linear runs generated:
(i) defining co-ordinate points within each linear run as belonging to a particular span and circuit; and
(ii) defining co-ordinate points within each circuit as belonging to a particular conductor.

2. A method according to claim 1, wherein the step of identifying the sets of co-ordinate points from the potential co-ordinate points within the cell comprises applying a Hough transformation to the potential co-ordinate points in a projection of those points onto a horizontal plane.

3. A method according to claim 2, wherein the step of applying a Hough transformation includes analysing potential co-ordinate points in an R,θ accumulator space, and incrementing the accumulator for each θ and R for each co-ordinate point that lies within that vertical plane, such that on completion of analysis of all potential co-ordinate points, the accumulators represent the number of coordinate points within each vertical plane, θ represents the angular orientation of the plane in geographical terms and R represents the distance to the plane from a prescribed position in the cell.

4. A method according to claim 3, wherein the plurality of substantially parallel vertical planes are identified by summing the square of the accumulator within a tolerance band of each R,θ pair.

5. A method according to claim 2, further including the step of identifying sets of accumulators having peak values of similar θ with prescribed R separation, each said set of accumulators representing substantially parallel vertical planes separated by a prescribed distance.

6. A method according to claim 2, wherein the step of identifying a plurality of individual subsets of coordinate points comprises identifying individual local maxima in Hough accumulator space around an R,θ representing an identified central vertical plane.

7. A method according to claim 1, wherein the step of analysing the distribution of coordinate points of a vertical plane comprises:
(a) applying statistical analysis to the distribution of co-ordinate points within each identified vertical plane, so as to provide a set of ranked vertical plane segments; and
(b) allocating the co-ordinate points from the highest ranked plane segment and removing the allocated co-ordinate points from the set of potential co-ordinate points.

8. A method according to claim 7, wherein the step of applying statistical analysis to the distribution of co-ordinate points within each identified vertical plane is iteratively repeated on a reduced set of co-ordinate points with respect to the remaining vertical plane segments, with progressively lower rankings being reassigned to the remaining planes, to identify the successively next prominent vertical plane segment.

9. A method according to claim 8, wherein the step of analysing the distribution of co-ordinate points within each identified vertical plane is repeated until no vertical plane segment remains whose ranking meets a prescribed threshold.

10. A method according to claim 7, wherein the vertical plane segment ranking relates to parameters including: linearity of co-ordinate point sets; uniformity of distribution of co-ordinate point sets; gaps within co-ordinate point sets.

11. A method according to claim 1, wherein the step of aggregating the vertical plane segments into one or more linear runs comprises analysing the alignment and separation of the vertical plane segments and, as a result of the analysis, grouping plane segments into a set considered as a run.

12. A method according to claim 11, wherein the step of analysing the alignment and separation of vertical plane segments comprises:
(a) applying a ranking to the vertical plane segments;
(b) allocating the highest ranked vertical plane segment to a first run with a nominal zero width; and
(c) adding to the first run all vertical plane segments which meet one or more prescribed run inclusion criteria.

13. A method according to claim 12, wherein the one or more run inclusion criteria includes: whether the difference in orientation between the vertical plane segment and the first run is within a prescribed range; whether the vertical plane segment is within a prescribed distance from the first run.

14. A method according to claim 12, wherein the step of adding vertical plane segments to said first run includes adjusting the parameters of the first run in accordance with the new vertical plane segment.

15. A method according to claim 12, wherein the step of adding vertical plane segments to said first run is repeated until no further vertical plane segments can be added to the first run.

16. A method according to claim 12, wherein the step of analysing the alignment and separation of the vertical plane segments is repeated to establish second and further runs.

17. A method according to claim 1, wherein the step of defining co-ordinate points within each linear run as belonging to a particular span and circuit comprises:
(a) projecting all co-ordinate points allocated to vertical planes within a particular run to a centreline plane of the run; and
(b) analysing the projected points in the 2D space defined by that vertical plane.

18. A method according to claim 17, wherein the step of analysing the projected points is conducted by way of a Hough analysis in 3D Hough space, so as to identify catenaries and sets of vertically separated catenaries.

19. A method according to claim 17, wherein the Hough analysis involves identifying catenaries and grouping the identified catenaries into catenary sets based on the location of the catenary vertex, said catenary vertex being defined in terms of $D_0$ (distance of vertex along the run) and H (height of vertex).

20. A method according to claim 19, wherein catenaries with proximate $D_0$ are allocated to the same span, whilst catenaries allocated to the same span but with H differing by at least a prescribed value are allocated to different circuits.

21. A method according to claim 1, wherein the step of defining co-ordinate points within each circuit as belonging to a particular conductor comprises establishing a set of vertical planes each containing a single catenary, and thus a single conductor.

22. A method according to claim 21, wherein the step of defining co-ordinate points within each circuit as belonging to a particular conductor is repeated on all points allocated to each individual conductor vertical plane, to result in defined single catenaries representing individual conductors.

23. A method according to claim 1, including the step of uniquely identifying and characterising each individual conductor.

24. A method according to claim 23, wherein the step of uniquely identifying and characterising each individual conductor comprises applying a least squares regression technique to determine the best fit catenary parameters.

25. A method according to claim 1, wherein the positions of end points of the particular conductors is determined by calculating intersect points between immediately adjacent conductors.

26. A method according to claim 25, further including the step of identifying powerline poles by analysing co-ordinate points not associated with conductors in the proximity of the end points of the conductors.

27. A method according to claim 26, wherein a priori and/or a posteriori information regarding the powerline poles is used to refine the positions of end points of the conductors.

28. A method of processing image data obtained from scanning a network infrastructure in order to identify conductors, said image data comprising a plurality of co-ordinate points in three-dimensional space, the method including the steps of:
   (a) analysing the co-ordinate points to identify sets of co-ordinate points indicative of a plurality of substantially parallel lines; and
   (b) analysing each of the sets identified in said step (a) to identify co-ordinate points indicative of a line from said plurality of substantially parallel lines to thereby identify and map hanging catenaries representing said conductors.

29. A method according to claim 28, wherein the substantially parallel lines represent either substantially parallel vertical planes or substantially parallel vertically separated hanging catenaries.

30. A non-transitory computer-readable medium storing a computer program including logic functionality which, when executed by a processor, implements, when provided with a scanned image data set, the method according to claim 1, and outputs data representative of identified conductors in a network infrastructure.

31. A computer-based system for processing scanned image data to identify conductors in a network infrastructure, the system including:
   (a) data input means to receive scanned image data;
   (b) a processing unit configured to carry out the method according to claim 1; and
   (c) output means to provide data representative of identified conductors in a network infrastructure.

32. A non-transitory computer-readable medium storing a computer program including logic functionality which, when executed by a processor, implements, when provided with a scanned image data set, the method according to claim 28, and outputs data representative of identified conductors in a network infrastructure.

33. A computer-based system for processing scanned image data to identify conductors in a network infrastructure, the system including:
   (a) data input means to receive scanned image data;
   (b) a processing unit configured to carry out the method according to claim 28; and
   (c) output means to provide data representative of identified conductors in a network infrastructure.

\* \* \* \* \*